United States Patent

Evans

[11] 3,897,971
[45] Aug. 5, 1975

[54] TRAILER INSTALLATION
[75] Inventor: John J. Evans, Chicago, Ill.
[73] Assignee: DDT, Inc., Chicago, Ill.
[22] Filed: June 17, 1974
[21] Appl. No.: 479,752

[52] U.S. Cl. .............. 296/24 R; 108/40; 105/372; 211/149
[51] Int. Cl. ............................................. B61d 3/06
[58] Field of Search .................. 105/370, 371, 372; 296/24 R, 3, 28 R; 211/149; 108/40, 134, 48; 49/246, 250

[56] References Cited
UNITED STATES PATENTS
2,199,981  5/1940  Bell ............................. 108/134 X
2,584,506  2/1952  Shreve ............................. 105/370
2,825,600  3/1958  Macomber ..................... 105/371 X

*Primary Examiner*—Albert J. Makay
*Attorney, Agent, or Firm*—Dawson, Titton, Fallon & Lungmus

[57] ABSTRACT

A trailer installation including a multiple member load carrying deck adapted to be pivoted from a first position of storage within the trailer along one sidewall into a load carrying position wherein the members extend across the trailer between the sidewalls thereof.

10 Claims, 18 Drawing Figures

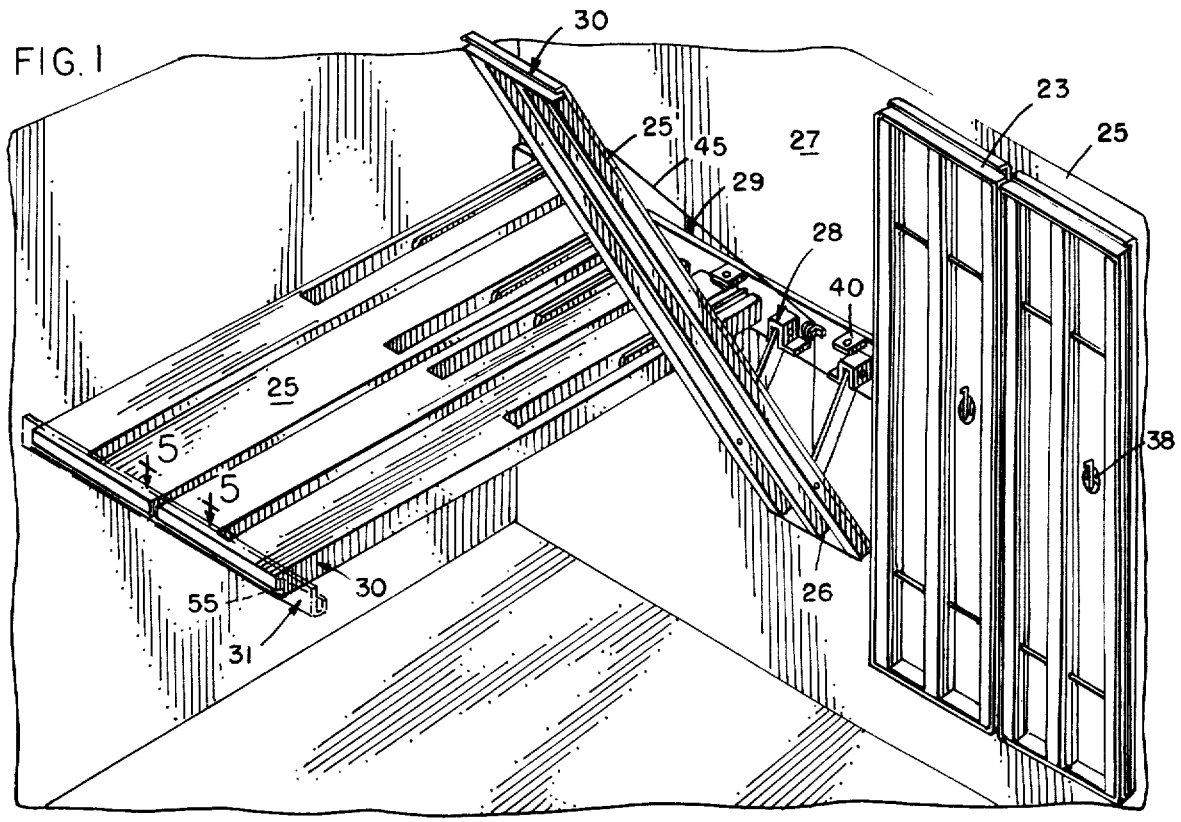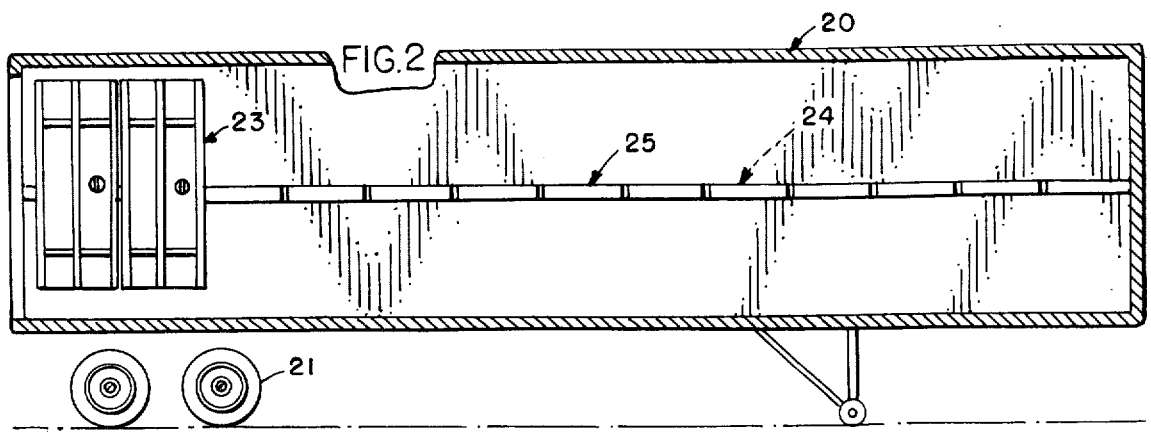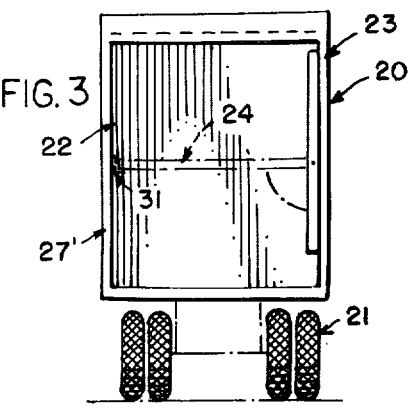

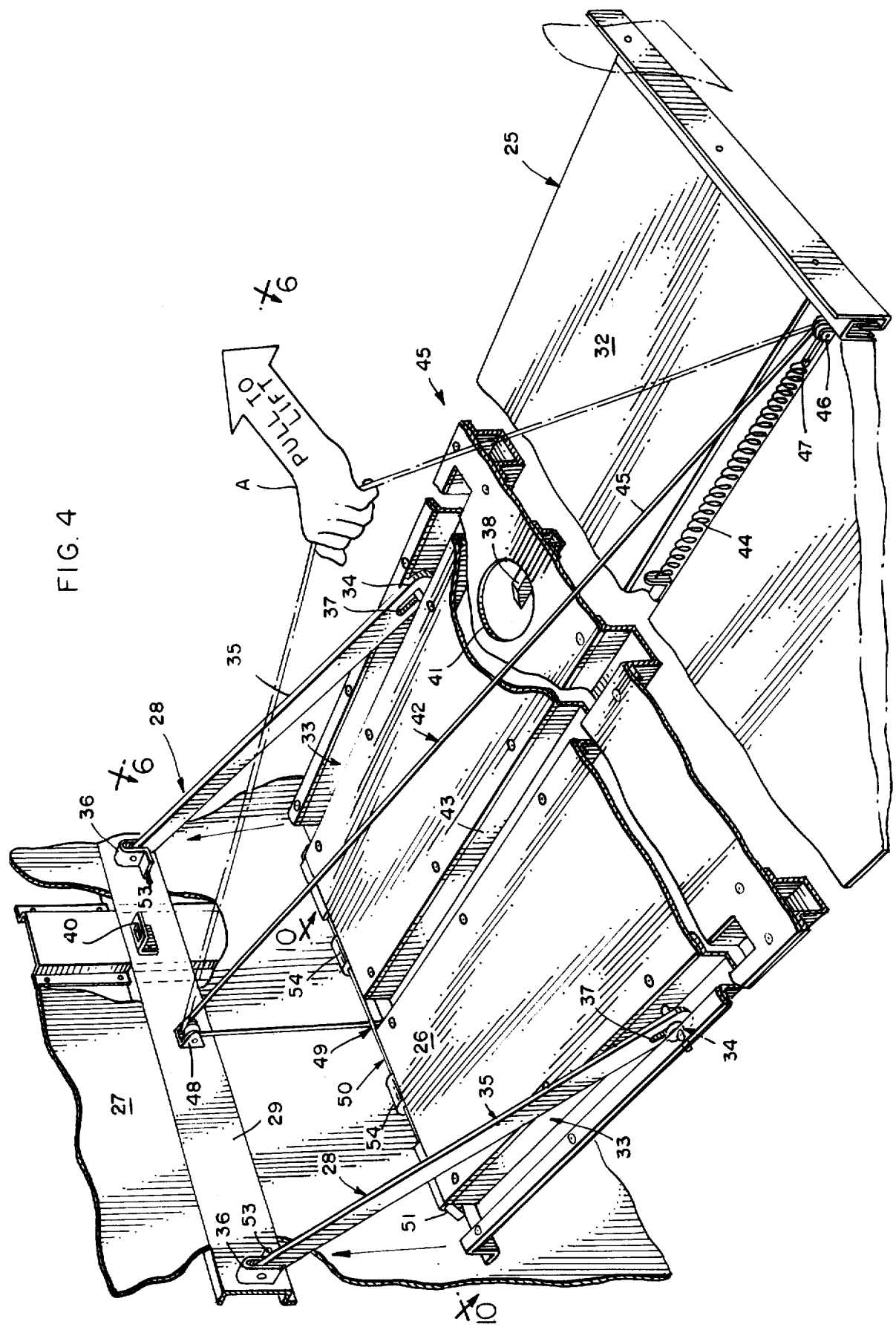

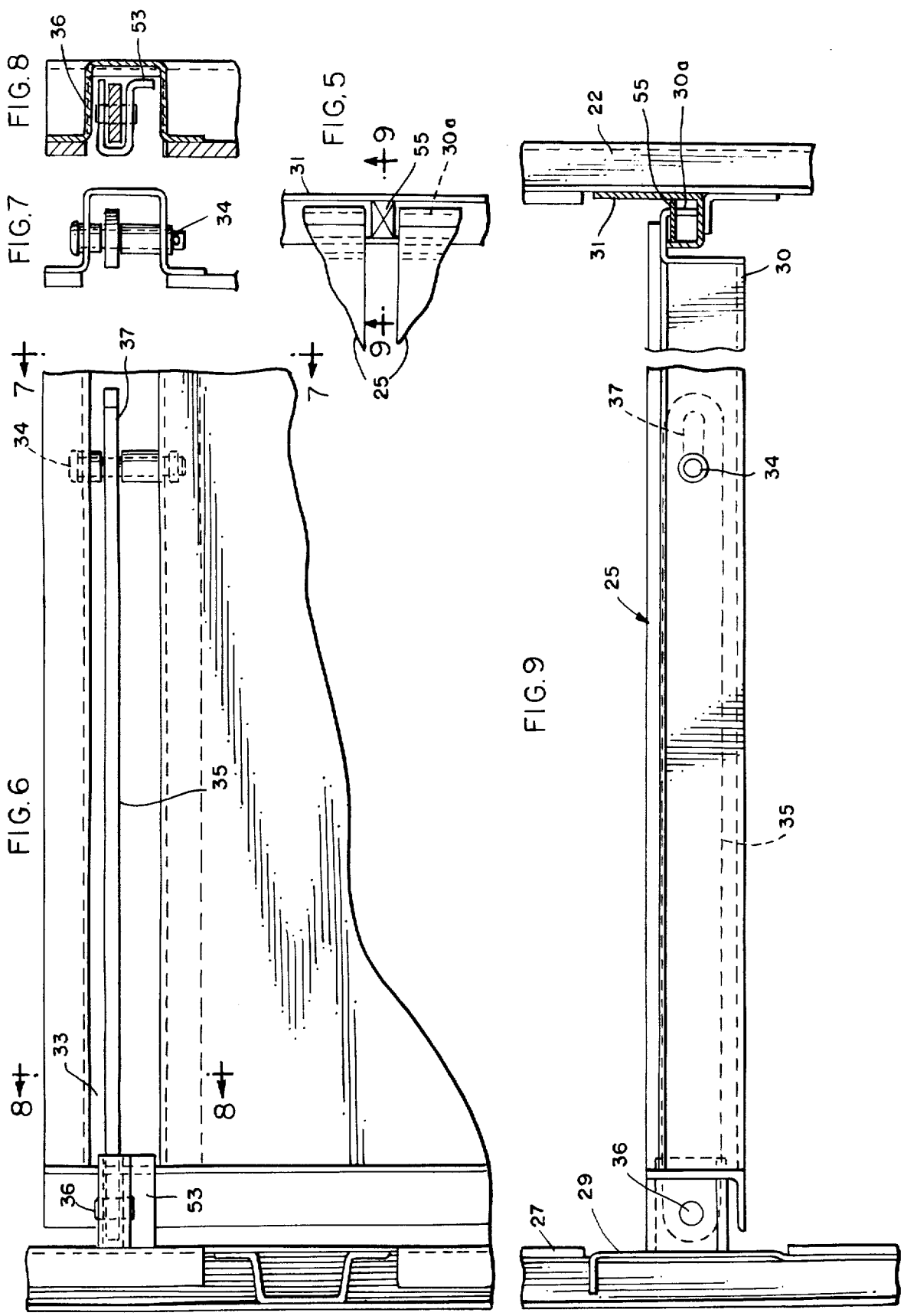

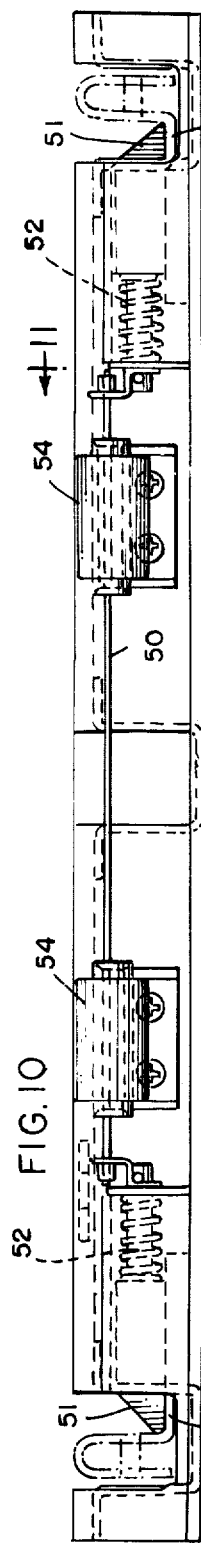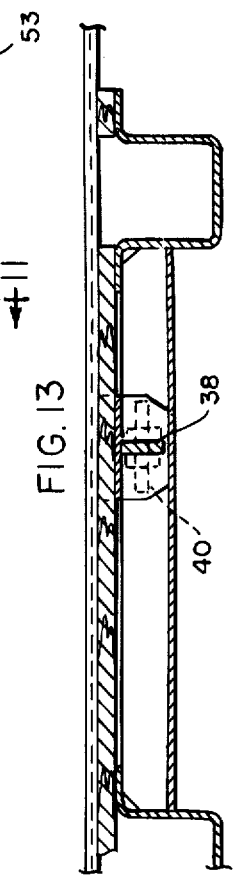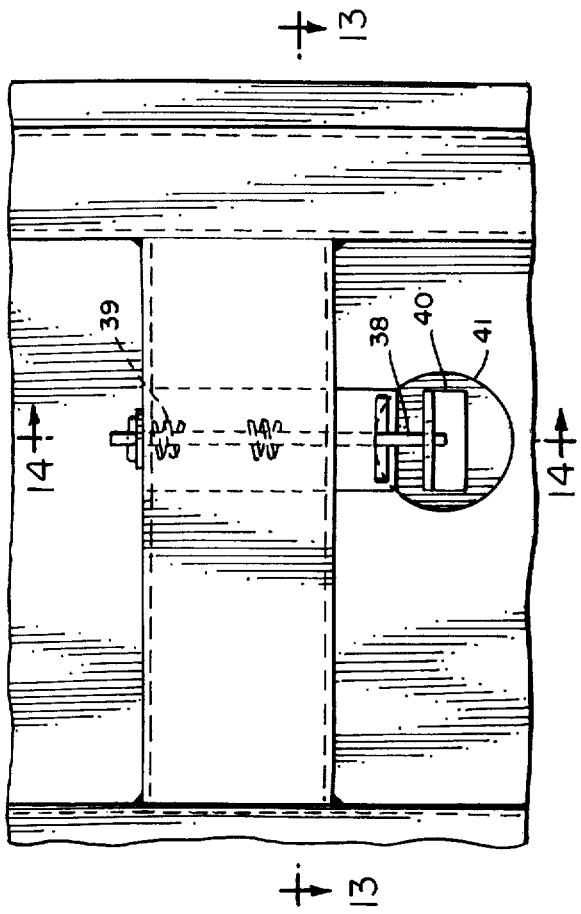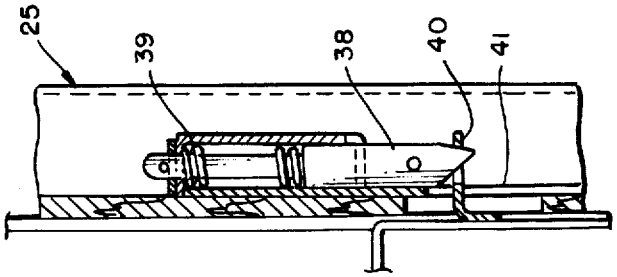

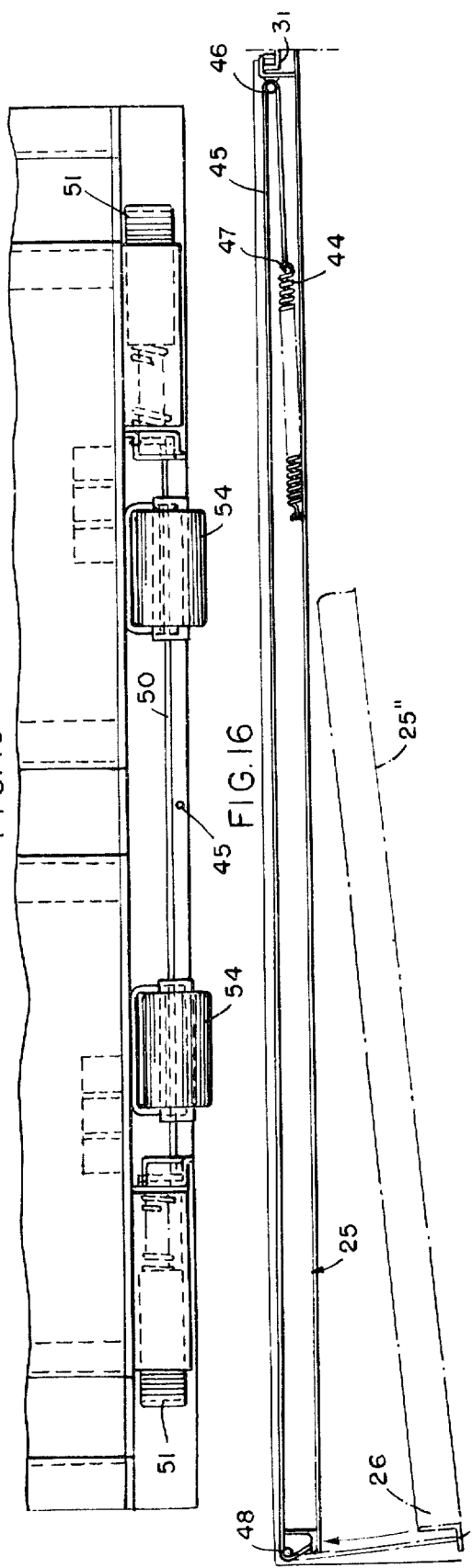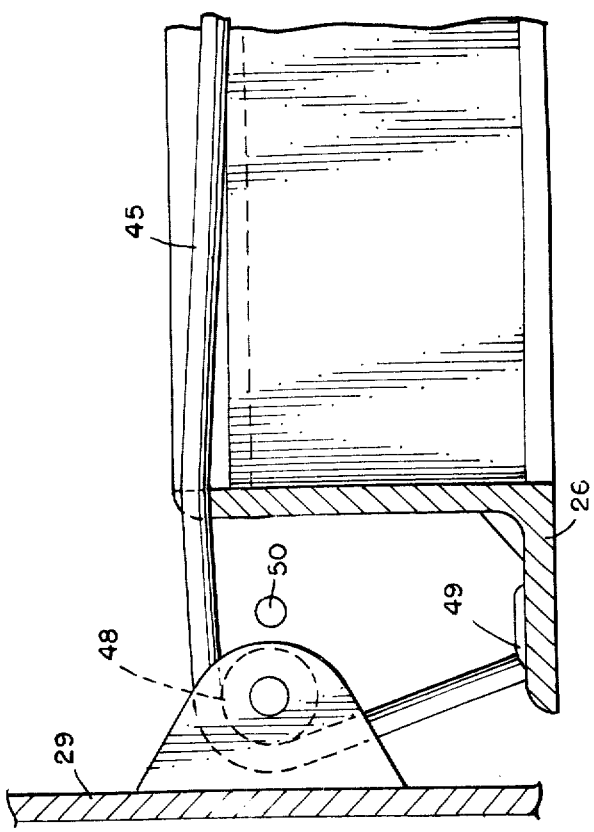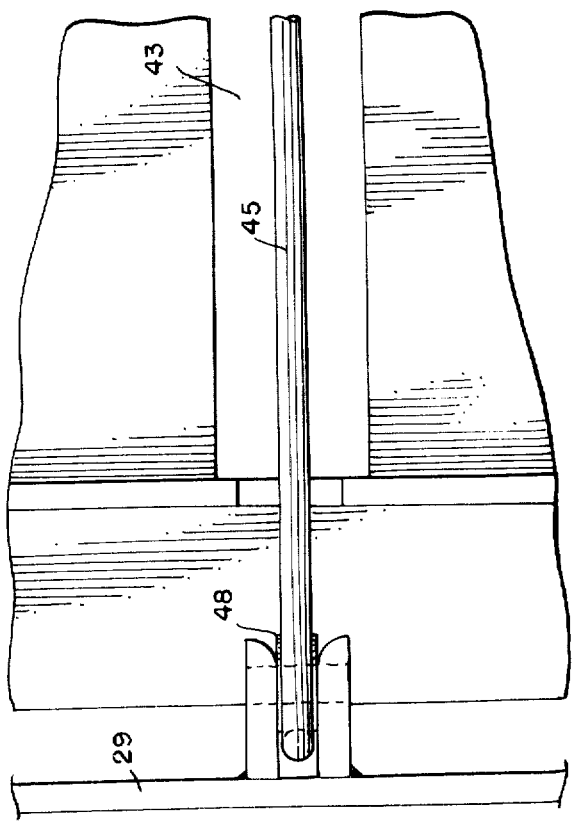

TRAILER INSTALLATION

BACKGROUND AND SUMMARY OF INVENTION

It is often desirable to be able to load a trailer with two levels of merchandise. Heretofore, this has required special planks or decks which can be anchored in place only with difficulty and only then with extensive labor. The instant invention relates to a trailer installation of this type and, more particularly, to a trailer decking system.

Through the instant invention I have overcome this drawback through the use of a deck made up of a plurality of elongated members, each one of which is pivoted to one sidewall and can be swung into position to extend across the trailer width in a load carrying position. Thus, the deck is a permanent installation but unobtrusively stored when not in use — but when in use fully stabilized against inadvertent detachment. In the preferred embodiment of the invention, I provide support rails along the two trailer sides for accomplishing the support and latching functions and which obviate the need for additionally penetrating the sidewalls or the trailer posts with support and/or latching members.

Additional advantages may be seen in the details of construction and operation set down in the ensuing detailed description.

DETAILED DESCRIPTION

The invention is described in conjunction with an illustrative embodiment in the accompanying drawing, in which FIG. 1 is a fragmentary perspective view of a trailer interior showing a plurality of the members making up the inventive installation and with members in different operative positions;

FIG. 2 is a longitudinal sectional view through the trailer showing the multiple member deck in both load carrying and storage positions;

FIG. 3 is an end elevational view (partially schematic) showing the deck installation in storage position in solid line and in load carrying position in dotted line;

FIG. 4 (second drawing sheet) is an enlarged, fragmentary perspective view showing one member of the deck in an intermediate position, i.e., about to be moved into load carrying position;

FIG. 5 is a fragmentary top plan view of a section of the deck providing member such as would be seen along the line 5—5 of FIG. 1;

FIG. 6 is a fragmentary top plan view of one member of the deck and showing the pivot link connection securing the member to one sidewall of the trailer, the view in FIG. 6 corresponding generally to that which would be seen along the sight line 6—6 applied to FIG. 4 but with the understanding that the member has been pivoted into load carrying position;

FIG. 7 is a fragmentary end elevational view, partially in section, such as would be seen along the sight line 7—7 applied to FIG. 6;

FIG. 8 is another sectional view and corresponds to that which would be seen along sight line 8—8 applied to FIG. 6;

FIG. 9 is a side elevational view, partially broken away and in fragmentary form of the construction seen in FIG. 6 and with a partial section through FIG. 5 as indicated thereon;

FIG. 10 is a cross sectional view of the latching means at the pivoted end of each member and corresponds to what would be seen along the sight line 10—10 applied to FIG. 4 but with the understanding that the member is pivoted further upwardly and latched in load carrying position;

FIG. 11 is a sectional view taken along the line 11—11 of FIG. 10;

FIG. 12 is a fragmentary elevational view of a deck member and featuring the latch for maintaining the member in storage position;

FIG. 13 is a sectional view taken along the line 13—13 of FIG. 12;

FIG. 14 is another sectional view, also in fragmentary form, taken along the line 14—14 of FIG. 12;

FIG. 15 is a fragmentary elevational view of the latching means for maintaining the member in load carrying position and is taken essentially at right angles to the showing in FIG. 10;

FIG. 16 is a fragmentary side elevational view showing the movement of a member from the orientation in FIG. 4 (represented in dashed line in FIG. 16) into load carrying position;

FIG. 17 is an enlarged fragmentary top plan view of a portion of the cable system at the pivoted end of the member and seen in more complete form in FIG. 4; and FIG. 18 is a fragmentary cross sectional view taken at right angles to the showing in FIG. 17.

In the illustration given and with reference first to FIG. 3 (first drawing sheet), the viewer is looking into the open rear end of a trailer generally designated 20. The trailer is equipped with the usual wheels 21. Although the invention is described in conjunction with a conventional trailer, it will be appreciated that the invention has application to a wide variety of structures including various freight carrying bodies or vehicles and the term "trailer" as used herein should be so construed. However, the invention in concerned only with the interior of the trailer box 22 which is seen to have a height greater than its width. This enables a deck generally designated 23 to be maintained in a storage position when not in use but easily pivoted into a load carrying position 24 wherein it is positioned about midway of the trailer height — thereby affording an additional surface of platform for the support of merchandise. The deck 24, in load carrying position, can also be seen in FIG. 2 and there is seen to consist of a plurality of individual members generally designated 25. Each member 25, as can be appreciated from FIG. 1, is pivotable from a storage position (see the two units at the extreme right in FIG. 1) through an intermediate position (see the intermediate member designated 25') to a load carrying position (see the two left hand members 25).

When each member 25 is in load carrying position it has a first end as at 26 which is adjacent one sidewall 27 and, in fact, is pivotally connected thereto by a pivot and linkage means generally designated 28. The pivot and linkage means 28 is seen to be provided on a support rail 29 anchored permanently to the first sidewall 27.

The other end 30 of each member 25 is supported in load carrying mode by means of a second support rail 31, also anchored to the trailer, but to the other sidewall 27' (see FIG. 3).

The details for achieving the pivotal movement of each member 25 can be appreciated better from a consideration of FIG. 4 (second drawing sheet). First, it will be noted that the member 25 has a flat upwardly facing surface when it is in the load carrying position. This surface 32 is interrupted by a pair of slots or grooves 33, one adjacent each longitudinal side edge of the member 25, for the purpose of accommodating the pivot and linkage means 28. The means 28 includes a first pivot means 34 mounted in each groove 33 and affords a pivotal connection for one end of a rigid link 35. The other end of each link 35 is pivitally connected as at 36 to a second pivot means advantageously mounted on the first mentioned support rail 29.

As pointed out previously in connection with the description of the views of the drawing, the showing in FIG. 4 is of the member in an intermediate position — somewhat akin to that designated 25' in FIG. 1 but more precisely shown in dashed line and designated 25" in FIG. 16. Further upward movement of the one end 26 (still referring to FIG. 16) brings the member 25 into its load carrying position designated 25 in FIG. 16. To accommodate this last movement, I provide a hinge connection between the links 35 and the first pivot means 34 in the form of a pin fixed to the deck in groove 33 and movable within a slot 37 in link 35 (see FIGS. 4, 6, 7 and 9). The pivot means 34 can be seen in greater detail in FIGS. 6 and 7. In like fashion, I have shown the second pivot means 36 in greater detail in FIGS. 6 and 8. When the member 25 is in load carrying position, its other end 30 (FIGS. 1 and 9) is supported on a rail 31 (here illustrated as a J-shape) permanently affixed to the other sidewall 27'.

When each member 25 is in the alternative mode, i.e., storage position, as at 23 in FIGS. 1–3, it is advantageously latched by means of a first latch means 38 (see the central portion of FIG. 4 and FIGS. 12–14). As can be best appreciated from FIGS. 12 and 14, the first latch means 38 is spring loaded as at 39 and cooperates with a first keeper means 40 (see particularly the upper central portion of FIG. 4 and FIG. 14). It will be noted that the first latch means 38 is provided on the underside of each panel 25 and the panel 25 is apertured as at 41 (see FIGS. 4, 12 and 14) for the purpose of permitting engagement of the first latch means 38 with the first keeper means 40.

To initiate pivotal movement of the member 25 from the storage position toward the load carrying position, it is merely necessary to push upwardly on the first latching means 38 (overcoming the bias of spring 39) to disengage the first latching means 38 from the first keeper means 40. Thereafter the member 25 pivots under very slight pressure to the condition seen in FIG. 4 or to the dashed line position designated 25" in FIG. 16.

To complete the movement of each member 25 into the load carrying position, it is only necessary to exert tension on a cable system generally designated 42 (see FIG. 4). For this purpose, I equip each member 25 with a centrally disposed, longitudinally extending groove 43 in which is mounted a spring 44 fixed at one end (see also FIG. 16). The cable system 42 includes a cable 45 which is entrained about a pulley 46 and connected at one end (as at 47) to the free end of the spring 44. Proceeding toward the other end of the cable 45, we find the same to be entrained over a second pulley 48 which is permanently affixed to the support rail 29. The other end 49 of the cable 45 is connected to the end of the deck 26, as seen in FIG. 18 at 49. Through the use of the cable system 42, just described, I am able to lift the member 25 (more precisely, one end 26 thereof) into a horizontal load carrying position.

A second cable 50 (FIGS. 4, 10 and 15) is in turn connected between a pair of latches constituting a second latch means and operative to automatically secure each panel 25 in its load carrying position. The latches just referred to can be best seen in FIG. 10 where they are designated by the numeral 51. Each latch 51 is spring loaded as at 52 and is adapted to engage a second keeper means 53 which consists of an integral bracket provided as part of the second pivot means 36. When end 26 is brought upwardly toward horizontal load carrying position (see FIG. 16), the latches 51 automatically retract against the urging of springs 52 by virtue of the beveled surface of each latch contacting keeper means 53, and thereafter snap outwardly (under the pressure of springs 52) into place — as seen in FIG. 10 — and then the deck is secured in horizontal load carrying position. This can be readily appreciated from a consideration of FIG. 4 where the second pivot means 36 is shown (along with its laterally extending flange portion 53 — which constitutes the second keeper means), and the latch 51.

As can be best seen in FIG. 10 (also FIG. 4) the second cable 50 is guided by rollers 54 which serve a dual purpose. The rollers 54 are rotatably mounted on the deck 26 to assist the deck in rolling up the wall 27. The rollers are axially apertured to permit receipt therein of the cable 50 and guide the same. The rollers 54 in combination with the slot 37 (see FIG. 4) permit the member 25 to move up the sidewall 27 — and without the generation of binding forces as the deck 25 approaches the horizontal position.

OPERATION:

In the operation of the inventive construction, the members 26 when not in operation are stored against the wall 27 (in the position 23 in FIG. 1). When it is desired to convert the idle panels 25 to load carrying members, the latches 38 are first released. When the member 25 is in stored position (as in FIG. 14), the latch 38 is engaged with the first keeper means 40.

After the first latch means 38 has been disengaged from the first keeper means 40, the member 25 (again referring to FIG. 1) can be pivoted from the vertical position seen in the right hand portion of FIG. 1 through the intermediate position designaged 25' in the central portion of FIG. 1 to the "almost horizontal" position designated 25" in FIG. 16. Little effort is required on the part of the artisan carrying out this operation as the weight of the member 25 causes it to pivot slowly — and as the rollers 54 move up the wall 27 (see FIG. 4). However, as the member 25 approaches the horizontal, i.e., approaches the position designated 25" in FIG. 16, the linkage angle (between the link 35 and the member 25 in FIG. 4) becomes smaller, substantial pressure is exerted by the rollers 54 against the wall 27, causing the member 25 to stop in the 25" position.

At this stage of the operation, the cable system 42 (more particularly the cable 45) assumes the configuration seen in solid line in FIG. 4. There, the cable 45 is seen to stand out from the groove 43 and presents a convenient hand grasping means. Thereafter the artisan whose hand is designated by the symbol A pulls on the cable 45 to move it to the dashed line position designated 45' in FIG. 4 whereupon the member 25 moves upwardly into the solid line position in FIG. 16. More precisely, the movement is at the end of 26 (still referring to FIG. 16) which moves upwardly, the opposite end of member 25 already having engaged the J track 31. The stoppage of the panel 25 in the 25″ position occurs when the rollers 54 abut the wall 27 in a pressure relationship and when the other end 30 of the member 25 has become engaged with the rail 31, thereby immobilizing that end against further movement.

As pointed out previously, when the member 25 is approaching the horizontal position, the latches 51 are automatically retracted by virtue of engaging keepers 53 and after passing thereby snap back into extended position (see FIG. 10) to engage the upper surface of the keepers 53 and thereby immobilize the end 26 agsinst any downward movement. The pivot means 36 along with the keeper means 53 serve an additional function in corralling or maintaining the member 25 (especially in the end 26) against longitudinal displacement. This function can be seen in FIGS. 16 and 9. With the deck member 25 in the load carrying position, all longitudinal forces to which the deck is subjected (breaking, humping, bumping, etc.) are transferred via the sidewalls of the groove 33 of the deck member 25 through the pivot means 36 to the support rail 29 — and thence into the sidewall 27 of the vehicle body.

Similarly, I provide an immobilization of the other end 30 of the deck member 25 when the same is in the load carrying position. For this purpose, a lug 55 (see particularly FIGS. 5 and 9) is located within the support rail 31 between each pair of adjacent deck sections 25. Thus, the "free" end of the deck member 25 has a portion of its parametric flange as at 30a in FIG. 9 abutting the lug 55 to prevent longitudinal movement.

When it is indicated to convert the load carrying deck to storage condition, it is only necessary to pull on cable 50 midway between the rollers 54 and the deck member 25 is thereupon released from load carrying position and moves toward the intermediate position shown in FIG. 4 and the position designated at 25″ in FIG. 16. Thereafter the artisan merely has to push up on the end 30 whereupon the deck member 25 moves slowly upwardly toward the vertical position seen at the right hand portion of FIG. 1, and the latch 38 again engages the keeper 40.

It should be noted that the cable 45 is retracted within the groove 43 of the deck member 25 in both of its load carrying and storage positions, emerging only to present a convenient hand grasping means to the artisan when position change is initiated. Thus, the unskilled artisan will naturally follow the operating instructions and the cable does not project from its useful storage within the groove 33 except at a time when change of position is indicated.

I claim:

1. A freight carrying installation comprising a body having a height greater than its width,
    a positionable deck for supporting merchandise between the sidewalls of said body about midway the body height and including a plurality of elongated deck members arranged in side-by-side relation along the body length, each of said members being adapted in a first position to extend upwardly along one body sidewall and in a second position to extend across the width of said body,
    each of said members having two longitudinally extending grooves in the surface thereof facing upwardly when said member is in said second position, said grooves extending to the one end of said member adjacent said one sidewall when said member is in said second position,
    a first pivot means in each groove spaced from said one end of said member,
    a second pivot means on said one sidewall aligned with each first pivot means,
    a rigid link interconnected between each first and second pivot means, said link retracting to an unobstructing position within each said groove and being parallel with the deck in a horizontal load carrying position, and,
    a support rail on the other sidewall of said body for the other end of each member whereby each member is pivotal from a vertical storage position to said horizontal load carrying position.

2. The structure of claim 1 in which said one sidewall is also equipped with a supporting rail horizontally aligned with the other sidewall support rail, said second pivot means being mounted on said one sidewall support rail, said one sidewall support rail also being equipped with latch means for securing each member in said storage and load carrying positions whereby said deck is latchable in alternative positions without the need for substantial penetration of said one sidewall.

3. The structure of claim 2 in which each panel is equipped with a spring loaded first latch means movable lengthwise of the member, said one sidewall support rail being equipped with a first keeper means vertically aligned with said first latch means and engageable therewith when said member is in storage position.

4. The structure of claim 2 in which each member at said one end thereof is equipped with a spring loaded second latch means movable widthwise of said member, said one sidewall support rail being equipped with a second keeper means horizontally aligned with said second latch means and engageable therewith when said member is in load carrying position.

5. The structure of claim 4 in which said second keeper means is integral with said second pivot means.

6. The structure of claim 4 in which said second latch means includes a pair of latches, one adjacent each side of said member, cable means interconnecting said latches, said latches being arranged to automatically engage said second keeper means when said member is moved into horizontal load carrying position and said cable means being operative upon tensioning of the same to retract said latches from said second keeper means to disengage the same and permit movement of said member out of said horizontal load carrying position.

7. The structure of claim 1 in which each of said members is equipped with a third longitudinally extending groove, a cable system operatively associated with said groove and arranged and constructed to have a portion of said system project out of said third groove only when said member is intermediate said vertical storage position and said horizontal load carrying position.

8. The structure of claim 1 in which said member at said one end thereof is equipped with roller means adapted to engage said one sidewall as said member is pivoted toward the horizontal load carrying position and said rigid length being equipped with slot means permitting limited movement thereof relative to said first pivot means.

9. The structure of claim 8 in which said member is equipped with latch means for securing the same in load carrying position said latch means including a pair of latches, one adjacent each side of said member with cable means interconnecting said latches, said cable means extending axially through said roller means.

10. The structure of claim 1 in which said one sidewall is also equipped with a supporting rail horizontally aligned with the other sidewall support rail, said second pivot means being mounted on said one sidewall support rail, said one sidewall support rail also being equipped with latch means for securing each member in a load carrying position, said other sidewall support rail being equipped with lug means for stabilizing the other end of each member in load carrying position.

* * * * *